United States Patent [19]

Mauer et al.

[11] Patent Number: 5,965,670
[45] Date of Patent: Oct. 12, 1999

[54] CURABLE-FILM FORMING COMPOSITIONS HAVING IMPROVED MAR AND ACID ETCH RESISTANCE

[75] Inventors: George W. Mauer, Brunswick Hills, Ohio; William E. Michael, Gibsonia, Pa.; John W. Burgman, Murrysville, Pa.; Leigh-Ann Humbert, Allison Park, Pa.

[73] Assignee: PPG Industries Ohio, Inc., Cleveland, Ohio

[21] Appl. No.: 09/072,472

[22] Filed: May 4, 1998

Related U.S. Application Data

[63] Continuation-in-part of application No. 08/998,373, Dec. 24, 1997.

[51] Int. Cl.$^6$ .................................................. C08G 79/02
[52] U.S. Cl. ........................ 525/398; 525/400; 525/438; 525/443; 525/456
[58] Field of Search ................................... 525/398, 400, 525/438, 443, 456

[56] References Cited

U.S. PATENT DOCUMENTS

| | | | |
|---|---|---|---|
| 4,147,679 | 4/1979 | Scriven et al. | 260/29.2 TN |
| 4,208,495 | 6/1980 | Chang et al. | 525/440 |
| 4,220,697 | 9/1980 | Wiedemann | 430/59 |
| 4,403,003 | 9/1983 | Backhouse | 427/407.1 |
| 4,528,333 | 7/1985 | Chang et al. | 525/398 |
| 4,550,137 | 10/1985 | Dowbenko et al. | 525/31 |
| 4,708,984 | 11/1987 | Forgione et al. | 525/127 |
| 4,710,542 | 12/1987 | Forgione et al. | 525/127 |
| 4,822,685 | 4/1989 | Perez et al. | 428/423.3 |
| 4,859,743 | 8/1989 | Ambrose et al. | 525/443 |
| 4,939,213 | 7/1990 | Jacobs, III et al. | 525/329.9 |
| 5,006,653 | 4/1991 | Forgione et al. | 544/196 |
| 5,071,904 | 12/1991 | Martin et al. | 524/458 |
| 5,084,541 | 1/1992 | Jacobs, III et al. | 528/45 |
| 5,089,561 | 2/1992 | Forgione et al. | 525/127 |
| 5,089,617 | 2/1992 | Forgione et al. | 544/196 |
| 5,098,947 | 3/1992 | Metzger et al. | 524/507 |
| 5,256,452 | 10/1993 | McMonigal et al. | 427/407.1 |
| 5,346,947 | 9/1994 | Guerro et al. | 524/591 |
| 5,565,243 | 10/1996 | Mauer et al. | 427/407.2 |
| 5,574,103 | 11/1996 | Wu et al. | 525/127 |
| 5,593,735 | 1/1997 | Wu et al. | 427/461 |
| 5,663,244 | 9/1997 | Barancyk et al. | 525/456 |

FOREIGN PATENT DOCUMENTS

| | | |
|---|---|---|
| 0 245 701 | 8/1993 | European Pat. Off. . |
| 0 604 922 | 6/1994 | European Pat. Off. . |
| 0 245 700 | 8/1994 | European Pat. Off. . |
| 0812867 | 12/1997 | European Pat. Off. . |
| WO97/47700 | of 0000 | WIPO . |
| WO98/27135 | of 0000 | WIPO . |
| WO96/04258 | 2/1996 | WIPO . |
| WO96/11915 | 4/1996 | WIPO . |
| WO96/15185 | 5/1996 | WIPO . |
| WO96/29318 | 9/1996 | WIPO . |
| WO96/34905 | 11/1996 | WIPO . |
| WO98/18856 | 5/1998 | WIPO . |
| WO98/27134 | 6/1998 | WIPO . |
| WO98/27166 | 6/1998 | WIPO . |

*Primary Examiner*—Terressa M. Mosley
*Attorney, Agent, or Firm*—William J. Uhl; Krisanne Shideler

[57] ABSTRACT

Curable film-forming compositions comprising acrylic polyols, aminoplast and carbamoyl triazines are disclosed. The compositions are useful as clear coats in composite color-plus-clear coatings.

25 Claims, No Drawings

CURABLE-FILM FORMING COMPOSITIONS HAVING IMPROVED MAR AND ACID ETCH RESISTANCE

CROSS REFERENCE TO RELATED APPLICATION

This application is a Continuation in Part of U.S. patent application Ser. No. 08/998,373 filed on Dec. 24, 1997.

BACKGROUND OF THE INVENTION

The present invention relates to curable film-forming compositions containing polyols cured with aminoplasts and carbamoyl triazines.

Of increasing concern in many geographic areas is the encounter with acidic precipitation. Coatings, particularly automotive original equipment coatings that are resistant to such environmental conditions like those that are resistant to etching by atmospheric acid precipitation ("acid etch resistance") are becoming increasingly desirable. Original equipment manufacturers are requiring that coating systems demonstrate acid etch resistance.

In addition to the requirement of acid etch resistance, original equipment coatings must also demonstrate mar and abrasion resistance; i.e., the appearance of the coating must not be detrimentally affected when the coating is contacted with an abrasive material. Mar and abrasion resistance is a desirable property particularly due to the popularity of commercial car washes where brushes are often used to wash car bodies.

A number of commercial coating compositions which demonstrate acid etch resistance do not provide adequate mar and abrasion resistance. Microparticulate materials such as silica, metal sulfides, and crosslinked styrene-butadiene have been added to coating systems to improve mar resistance, but gloss and distinctness of image of the systems is adversely affected due to light scattering at the particle surfaces.

Recently, triisocyanato or tricarbamoyl triazines have been developed as crosslinking agents for coating compositions containing active hydrogen-containing materials. These coating compositions also exhibit acid etch resistance, but mar resistance may be inadequate. The triazine compounds are disclosed in U.S. Pat. Nos. 4,939,213 and 5,084,541. However, these references do not disclose the use of triazines in combination with aminoplasts as crosslinking agents to improve both mar and acid etch resistance of a cured coating.

U.S. Pat. No. 5,574,103 discloses coating compositions comprising polyols, aminoplasts, and carbamoyl triazine compounds. However, the reference does not disclose improved mar and acid etch resistance of cured coatings, nor does it disclose amounts of aminoplast to triazine in the coating composition necessary to improve both mar and acid etch resistance.

It would be desirable to provide a curable composition for use as a coating which avoids the marring problems of the prior art coating systems, while exhibiting excellent acid etch resistance and appearance properties.

SUMMARY OF THE INVENTION

In accordance with the present invention, a curable composition, which is capable of exhibiting improved mar and acid etch resistance, is provided which comprises:

(a) an acrylic polyol polymer;

(b) about 20 to about 35 percent by weight, based on the total weight of resin solids, of an aminoplast; and (c) about 1 to 20 percent by weight, based on the total weight of resin solids, of a triazine compound of the formula: $C_3N_3(NHCOXR)_3$, wherein X is nitrogen, oxygen, sulfur, phosphorus, or carbon, and R is a lower alkyl group having one to twelve carbon atoms, or mixtures of lower alkyl groups. The total of components (b) and (c) is greater than 25 and less than 45, preferably about 30 to about 40 percent by weight, based on the total weight of resin solids.

DETAILED DESCRIPTION

In one embodiment of the invention, the film-forming composition of the present invention preferably comprises (a) up to about 70, preferably about 55 to about 70 percent by weight, more preferably about 60 to about 70 percent by weight, most preferably 65 to 70 percent by weight based on total weight of resin solids, of an acrylic polyol polymer;

(b) about 20 to about 35 percent by weight, preferably about 20 to about 30 percent by weight, based on total weight of resin solids, of an aminoplast; and (c) about 1 to 20, preferably 3 to 20, percent by weight, preferably about 5 to about 15 percent by weight, more preferably about 5 to about 10 percent by weight, based on total weight of resin solids, of a triazine compound of the formula: $C_3N_3(NHCOXR)_3$, wherein X is nitrogen, oxygen, sulfur, phosphorus, or carbon, and R is a lower alkyl group having one to twelve carbon atoms, or mixtures of lower alkyl groups. The total of components (b) and (c) is greater than 25 and less than 45, preferably about 30 to about 40 percent by weight, more preferably about 30 to about 35 percent by weight, based on the total weight of resin solids.

The composition may optionally contain an additional polyol polymer or oligomer different from the acrylic polyol polymer of component (a). In this embodiment, the amount of acrylic polyol polymer of component (a) may be less than 55 percent by weight; the total of acrylic polyol and additional polyol may be between about 55 and about 70 percent by weight, based on the total weight of resin solids in the film-forming composition.

The acrylic polymers are copolymers of one or more alkyl esters of acrylic acid or methacrylic acid optionally together with one or more other polymerizable ethylenically unsaturated monomers. Suitable alkyl esters of acrylic acid or methacrylic acid include aliphatic alkyl esters containing from 1–30, preferably 4–18 carbon atoms in the alkyl group. Examples include methyl methacrylate, ethyl methacrylate, butyl methacrylate, ethyl acrylate, butyl acrylate, 2-ethylhexyl acrylate and 2-ethylhexyl methacrylate. Suitable other copolymerizable ethylenically unsaturated monomers include vinyl aromatic compounds such as styrene which is preferred and vinyl toluene; nitriles such acrylonitrile and methacrylonitrile; vinyl and vinylidene halides such as vinyl chloride and vinylidene fluoride and vinyl esters such as vinyl acetate.

Hydroxyl functional groups are most often incorporated into the polymer by using functional monomers such as hydroxyalkyl acrylates and methacrylates, having 2 to 4 carbon atoms in the hydroxy-alkyl group including hydroxyethyl acrylate, hydroxyethyl methacrylate, hydroxypropyl acrylate, hydroxypropyl methacrylate, 4-hydroxybutyl acrylate, 4-hydroxybutyl methacrylate and the like. Also hydroxy functional adducts of caprolactone and hydroxyalkyl acrylates and methacrylates. Mixtures of these hydroxyalkyl functional monomers may also be used.

The acrylic polyol polymer preferably has beta-hydroxy ester functionality, and in a preferred embodiment comprises a polymer of:

1) an ethylenically unsaturated, beta-hydroxy ester functional monomer;
2) about 5 to about 50, preferably 10 to 30, percent by weight, based on total solid weight of monomers used to prepare the polymer, of an polymerizable ethylenically unsaturated, hydroxyalkyl functional monomer different from 1);
3) about 0 to about 40 percent by weight based on the total solid weight of monomers used to prepare the monomer of a vinyl aromatic monomer;
4) about 0 to about 60, preferably 0 to 30, percent by weight, based on the total solid weight of monomers used to prepare the polymer, of at least one alkyl ester of acrylic acid or methacrylic acid; and
5) about 0 to about 20 percent by weight, based on the total solid weight of monomers used to prepare the polymer, of at least one ethylenically unsaturated monomer different from 1), 2), 3), and 4) above;

The beta-hydroxy ester functional monomer is selected from the group consisting of:

a) an ethylenically unsaturated, epoxy functional monomer and a saturated carboxylic acid having about 13 to about 20 carbon atoms; and
b) an ethylenically unsaturated acid functional monomer and an epoxy compound containing at least 5 carbon atoms which is not polymerizable with the ethylenically unsaturated acid functional monomer.

The beta-hydroxy ester functional monomer is typically be present in the polymer in an amount of up to about 70 percent, preferably about 10 to about 70, more preferably about 20 to about 55 percent by weight, based on the total solid weight of monomers used to prepare the polymer.

Examples of ethylenically unsaturated, epoxy functional monomers include glycidyl acrylate, glycidyl methacrylate, allyl glycidyl ether, methallyl glycidyl ether, 1:1 (molar) adducts of ethylenically unsaturated monoisocyanates such as meta-isopropenyl-alpa,alpha,-dimethylbenzyl isocyanate with hydroxyl functional monoepoxides such as glycidol, and glycidyl esters of polymerizable polycarboxylic acids such as maleic acid, fumaric acid, and crotonic acid. Preferred are the epoxy-functional acrylates such as glycidyl acrylate, epoxy functional methacrylates such as glycidyl methacrylates, or mixtures thereof. Glycidyl methacrylate is particularly preferred.

Examples of saturated carboxylic acids include saturated monocarboxylic acids such as those which are noncrystalline at room temperature, particularly those having branched structures. Isostearic acid is preferred. As used herein the term "saturated" as in the phrase "saturated monocarboxylic acid" is intended to denote the absence of ethylenic unsaturation but is not intended to exclude aromatic unsaturation as found, for example, in a benzene ring.

Examples of ethylenically unsaturated acid functional monomers include monocarboxylic acids such as acrylic acid, methacrylic acid, and crotonic acid; dicarboxylic acids such as itaconic acid, maleic acid, and fumaric acid; and monoesters of dicarboxylic acids such as monobutyl maleate and monobutyl itaconate. Acrylic acid and methacrylic acid are preferred.

The epoxy compound does not contain ethylenic unsaturation which would participate in free radical initiated polymerization with the unsaturated acid monomer. Examples of such epoxy compounds are glycidyl esters and ethers, preferably those containing from 8 to 30 carbon atoms. Examples of glycidyl ethers are glycidyl ethers of alcohols and phenols such as butyl glycidyl ether, octyl glycidyl ether, phenyl glycidyl ether and para-(tertiary-butyl) phenyl glycidyl ether.

Examples of glycidyl esters are those of the structure:

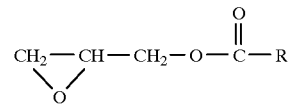

wherein R is a hydrocarbon radical containing from about 4 to about 26 carbon atoms. Preferably, R is a branched hydrocarbon radical, more preferably a tertiary aliphatic group of about 8 to about 10 carbon atoms such as neopentanoate, neoheptanoate, and neodecanoate. Glycidyl esters of commercially available mixtures of tertiary aliphatic carboxylic acids such as those available from Shell Chemical Company as VERSATIC ACID 911 are particularly preferred. The glycidyl esters themselves are also commercially available from Shell Chemical Company as CARDURA E.

Examples of other epoxy compounds are 1,2-pentene oxide and styrene oxide.

The ethylenically unsaturated acid functional monomer and epoxy compound are typically in an equivalent ratio (acid to epoxy) of about 1:1. The ethylenically unsaturated acid functional monomer and epoxy compound may be pre-esterified prior to free radical initiated polymerization, or esterification and polymerization may take place simultaneously.

In addition to hydroxyl groups, the polymer may have carbamate functional groups. Such groups may be incorporated into the polymer in several ways. Carbamate functional groups may be incorporated into the polymer by copolymerizing the acrylic monomers with a carbamate functional vinyl monomer, for example a carbamate functional alkyl ester of methacrylic acid. These carbamate functional alkyl esters are prepared by reacting, for example, a hydroxyalkyl carbamate with methacrylic anhydride. Other carbamate functional vinyl monomers are, for instance, the reaction product of a hydroxyalkyl (meth) acrylate such as hydroxyethyl methacrylate, a diisocyanate such as isophorone diisocyanate, and a carbamate functional alcohol such as hydroxypropyl carbamate. Such monomers are disclosed in U.S. Pat. No. 5,098,947. Still other carbamate functional vinyl monomers may be used, such as the reaction product of isocyanic acid (HNCO) with a hydroxyl functional acrylic or methacrylic monomer such as hydroxyethyl acrylate. Carbamate groups can also be incorporated into the acrylic polymer by reacting a hydroxyl functional acrylic polymer with a low molecular weight carbamate functional material via a "transcarbamoylation" reaction. Such a reaction may be performed at about 130 to about 170° C. In this reaction, a low molecular weight carbamate functional material derived from an alcohol or glycol ether is reacted with the hydroxyl groups of the acrylic polymer, yielding a carbamate functional acrylic polymer and the original alcohol or glycol ether.

The acrylic polyol polymer can be prepared by solution polymerization techniques. In conducting the reaction, the monomers are heated, typically in the presence of a free radical initiator and optionally a chain transfer agent, in an organic solvent in which the ingredients as well as the resultant polymer product are compatible. Typically, the organic solvent is charged to a reaction vessel and heated to reflux, optionally under an inert atmosphere. The monomers and other free radical initiator are added slowly to the refluxing reaction mixture. After the addition is complete, some additional initiator may be added and the reaction mixture held at an elevated temperature to complete the reaction.

The acrylic polymer used in the clear film-forming composition typically has a weight average molecular weight of about 2,000 to about 25,000, preferably 3,000 to 10,000 as determined by gel permeation chromatography using a polystyrene standard. The hydroxyl equivalent weight of the polymer is generally about 200 to about 800, preferably about 300 to about 500.

The film-forming composition further includes an aminoplast crosslinking agent. Aminoplast crosslinking agents are well known in the art and are described in U.S. Pat. No. 5,256,452; Col. 9, Lines 10–28. The aminoplast crosslinking agent may be monomeric or polymeric and may be partially or fully alkylated.

The triazine compound in the curable composition of the present invention has the formula $C_3N_3(NHCOXR)_3$, wherein X is nitrogen, oxygen, sulfur, phosphorus, or carbon, and R is a lower alkyl group having one to twelve carbon atoms, or mixtures of lower alkyl groups. The X moiety is preferably oxygen or carbon, more preferably oxygen. The R moiety preferably has one to eight carbon atoms, for example, methyl, ethyl, n-propyl, i-propyl, butyl, n-octyl, 2-ethylhexyl, and R is preferably a mixture of methyl and butyl groups. Such compounds and the preparation thereof are described in detail in U.S. Pat. No. 5,084,541.

The triazine compound in the curable composition of the present invention may be added to the film-forming composition neat; that is, added by itself or in other resinous ingredients, or with solvents or other diluents.

The curable film-forming composition of the present invention may optionally further contain an additional polyol polymer or oligomer different from the acrylic polyol polymer of component (a). The additional polyol polymer or oligomer may be selected from acrylic polymers, polyester polymers and oligomers which are preferred, polyurethane polymers and oligomers, and mixtures thereof.

The acrylic polymer may be prepared as generally described above (but with different monomers).

When the additional polyol polymer or oligomer is a polyester, the polyester may be prepared in a known manner by condensation of polyhydric alcohols and polycarboxylic acids. Suitable polyhydric alcohols include, for example, ethylene glycol, propylene glycol, butylene glycol, 1,6-hexylene glycol, neopentyl glycol, diethylene glycol, glycerol, trimethylol propane, pentaerythritol and cyclohexane dimethanol.

Examples of suitable polycarboxylic acids used to prepare the polyester include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used.

The polyesters contain a portion of free hydroxyl groups (done by using excess polyhydric alcohol during preparation of the polyester) which are available for crosslinking reactions.

Polyurethanes can also be used as the additional polyol polymer or oligomer in the film-forming composition.

Among the polyurethanes which can be used are polymeric polyols which are prepared by reacting polyester polyols or acrylic polyols such as those mentioned above with a polyisocyanate such that the OH/NCO equivalent ratio is greater than 1:1 so that free hydroxyl groups are present in the product.

The organic polyisocyanate which is used to prepare the polyurethane polyol can be an aliphatic, substituted aliphatic, including aromatic substituted aliphatic polyisocyanates or mixtures thereof. Diisocyanates and/or higher polyisocyanates are suitable.

Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). An example of a suitable substituted aliphatic polyisocyanate is meta-tetramethyl xylylene diisocyanate.

When the curable film-forming composition of the present invention contains an additional polyol polymer or oligomer, it is present in the film-forming composition in amounts up to 30, preferably about 5 to 20, more preferably 5 to 10 percent by weight based on the total weight of resin solids in the film-forming composition.

Other optional ingredients, such as plasticizers, antioxidants, hindered amine light stabilizers, UV light absorbers and stabilizers may be formulated into the curable compositions of the present invention. These ingredients may be present (on an individual basis) in amounts up to 10 percent, preferably from about 0.1 to 5 percent by weight based on total weight of resin solids of the curable composition.

The film-forming composition of the present invention may contain color pigments conventionally used in surface coatings and may be used as a high gloss monocoat; that is, a high gloss pigmented coating. By "high gloss" it is meant that the cured coating has a 20° gloss and/or a DOI ("distinctness of image") measurement of at least about 80 as measured by standard techniques known to those skilled in the art. Such standard techniques include ASTM D523 for gloss measurement and ASTM E430 for DOI measurement.

Preferably, the compositions of the present invention are used as clear coats in multi-component composite coating compositions such as color-plus-clear composite coating compositions. A color-plus-clear composition typically comprises a base coat deposited from a pigmented or colored film-forming composition, and a transparent top coat (clear coat) applied over the base coat.

Preferably, the compositions of the present invention are organic solvent based. They may however be dispersed or solubilized in aqueous based solvents.

The film-forming composition of the base coat in the color-plus-clear composite coating can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds, and polyurethanes. In addition to resinous binders, the base coat may contain suitable crosslinking agents such as aminoplasts, polyisocyanates, polyacids, and the like, depending on the functional groups present on the resinous binder.

The resinous binders for the base coat can be organic solvent-based materials such as those described in U.S. Pat. No. 4,220,679, column 2, line 24, through column 4, line 40. Also, water-based coating compositions such as those described in U.S. Pat. No. 4,403,003, U.S. Pat. No. 4,147, 679 and U.S. Pat. No. 5,071,904 can be used as the binder in the base coat composition.

The base coat also contains pigments and other additional components traditionally used in base coat formulations. Suitable pigments include metallic or non-metallic pigments. Suitable metallic pigments include aluminum flake, copper bronze flake or metal oxide coated mica. Non-metallic pigments include inorganic pigments such as titanium dioxide, iron oxide, chromium oxide, lead chromate, and carbon black, or organic pigments such as phthalocyanine blue and phthalocyanine green. In general, the pigment is incorporated into the base coat composition in amounts of about 1 to 80 percent by weight based on the total weight of coating solids.

Various additional components that are well known in the art may be added to the base coat composition and include surfactants, UV stabilizers, flow control agents, thixotropic agents, fillers, anti-gassing agents, organic cosolvents, catalysts, and other customary auxiliaries. These materials can constitute up to 40 percent by weight of the total weight of the coating composition.

The base coating compositions can be applied to various substrates to which they adhere. The compositions can be applied by conventional means including brushing, dipping, flow coating, spraying and the like, but they are most often applied by spraying. The usual spray techniques and equipment for air spraying and electrostatic spraying and either manual or automatic methods can be used. Examples of these substrates are wood, metals, glass, plastic, foam, elastomeric substrates and the like. The color-plus-clear composite coating is particularly useful in applications over metals and elastomeric substrates that are found on motor vehicles.

The base coat compositions can be applied to the substrate by any conventional coating technique such as brushing, spraying, dipping or flowing, but they are most often applied by spraying. The usual spray techniques and equipment for air spraying, airless spray and electrostatic spraying in either manual or automatic methods can be used.

During application of the base coat to the substrate, a film of the base coat is formed on the substrate typically in a thickness of about 0.1 to about 5 mils (about 2.54 to about 127 microns), preferably about 0.1 to about 2 mils (about 2.54 to about 50.4 microns).

After forming a film of the base coat on the substrate, the base coat can be cured or alternately given a drying step in which solvent is driven out of the base coat film by heating or an air drying period before application of the clear coat. Suitable drying conditions will depend on the particular base coat composition, and on the ambient humidity if the composition is waterborne, but in general, a drying time of from about 1 to 15 minutes at a temperature of about 75 to 200° F. (21 to 93° C.) will be adequate.

The clear topcoat composition is typically applied to the base coat by spray application. As mentioned above, the clear topcoat can be applied to a cured base coat, or to a dried base coat before the base coat has been cured. In the latter instance, the two coatings are then heated to cure both layers simultaneously. Typical curing conditions are at 265 to 300° F. (129 to 149° C.) for 20 to 30 minutes. The clear coating thickness (dry film thickness) is typically about 1 to about 6 mils (about 25.4 to about 152.4 microns).

The curable compositions of the present invention have excellent etch resistance properties. As used herein, the term "etch resistance" refers to the ability of a cured composition to resist etching by acids and water spotting. Etch resistance is typically evaluated by visual inspection of coated substrates after actual or simulated weathering. It should be noted that simulated weathering typically, but not always, corresponds to actual weathering. Moreover, it should be noted that cured compositions may have different etch resistance properties when subjected to actual weathering in different geographic locations. An etch resistant composition, as discussed herein, refers to a composition which has etch resistant properties under actual weathering in at least one geographic site or which has etch resistant properties under simulated weathering. In addition to the acid etch properties the curable compositions of the present invention also have good mar or abrasion resistance properties, evaluated by measuring the gloss of coated substrates before and after abrading of the coated substrates using a consistent laboratory method.

The invention will further be described by reference to the following examples. Unless otherwise indicated, all parts are by weight.

Examples A and B illustrate the preparation of polymeric acrylic polyols.

EXAMPLE A

This example illustrates the preparation of an acrylic polyol containing hydroxyl groups derived from hydroxyethyl methacrylate and an adduct of acrylic acid and glycidyl neodecanoate.

A reaction vessel equipped with stirrer, thermocouple, condenser and addition funnels with pumps was charged with 539.0 g AROMATIC 100 solvent (blend of aromatic solvents available from Exxon Chemicals America), 169.0 g Butyl CELLOSOLVE Acetate (2-butoxyethyl ester of acetic acid, available from Union Carbide Chemicals and Plastics Co., Inc.) 533.0 g xylene, 1130.0 g GLYDEXX N-10 (glycidyl neodecanoate available from Exxon Chemicals America) and 3.63 g zinc octoate (40% in mineral spirits); and heated to reflux (about 167° C.). Two feeds, identified hereafter as Feed A and Feed B, were gradually and simultaneously added to the vessel over a period of 4 and 4.5 hours, respectively, while the contents of the vessel were maintained at reflux conditions. Feed A consisted of a mixture of 656.0 g styrene, 439.0 g hydroxyethyl methacrylate, 145.0 g 2-ethylhexyl acrylate, 241.0 g methyl methacrylate, 350.0 g acrylic acid and 18.4 g t-dodecyl mercaptan. Feed B consisted of a mixture of 82.0 g di-t-butyl peroxide and 248.0 g AROMATIC 100. After the addition of the two Feeds A and B was complete, the addition funnels were each rinsed with 50.0 g xylene. The reaction contents were stirred for an additional hour and cooled while adding 50.0 g xylene.

The resultant product had a total solids content of 64.05% measured for 1 hour at 110° C.; a Gardner-Holdt bubble tube viscosity of greater than Y+; an acid value of 7.44 mg KOH/g; an APHA color of 30; and a weight average molecular weight of 6503.

EXAMPLE B

This example illustrates the preparation of an acrylic polyol containing hydroxyl groups derived from hydroxyethyl methacrylate.

A reaction vessel equipped with stirrer, thermocouple, condenser and addition funnels with pumps was charged with 245.7 g AROMATIC 100 solvent, 36.0 g Butyl CELLOSOLVE Acetate and 15.0 g xylene and heated to reflux (about 162° C.). Two feeds, identified hereafter as Feed A and Feed B, were combined and gradually added to the vessel over a period of four hours while the contents of the vessel were maintained at reflux conditions. Feed A consisted of a mixture of 226.2 g styrene, 221.2 g hydroxyethyl methacrylate, 30.9 g 2-ethylhexyl acrylate, 107.9 g butyl methacrylate 51.5 g methyl methacrylate, 7.6 g acrylic acid and 6.5 g t-dodecyl mercaptan. Feed B consisted of a mixture of 14.7 g di-t-butyl peroxide and 30.0 g AROMATIC 100. After the addition of the two Feeds A and B was complete, a feed consisting of 2.7 g di-t-butyl peroxide and 22.9 g AROMATIC 100 was added to the reaction contents over 30 minutes. When the addition was complete, the reaction contents were stirred for an additional hour and cooled.

The resultant product had a total solids content of 65.2% measured for 1 hour at 110° C.; a Gardner-Holdt bubble tube viscosity of greater than Z6; an acid value of 2.7 mg KOH/g; an APHA color of 15–20; and a weight average molecular weight of 8896.

Examples 1–20 illustrate the preparation of clear film-forming compositions using the polymeric acrylic polyol of Example A. Examples 3, 4, 7–9, 12 and 20 are illustrative of the present invention. Examples 2, 5, 6, 10, 11, and 13–19 are comparative. The composition of Example 2 has a total crosslinker amount lower than that of the present invention; the compositions of Examples 5, 6, 10, and 11 have aminoplast amounts outside the range of the present invention; the compositions of Examples 13 and 14 have total crosslinker amounts higher than that of the present invention; the composition of Example 15 has a triazine amount higher than that of the present invention; Example 16 depicts a conventional polyol-aminoplast composition containing no triazine; the compositions of Examples 17 and 19 have no aminoplast and a triazine level higher than that of the present invention; and the composition of Example 18 has an aminoplast level lower than that of the present invention.

EXAMPLE 1

A formulation pre-mixture was prepared from the following ingredients:

| Ingredient | Parts by weight (grams) | Resin solids (grams) |
|---|---|---|
| AROMATIC 100 | 15.0 | 0 |
| Ethanol | 5.0 | 0 |
| EKTAPRO EEP[1] | 10.0 | 0 |
| TINUVIN 328[2] | 1.6 | 1.6 |
| TINUVIN 292[3] | 0.8 | 0.8 |
| polybutyl acrylate[4] | 0.52 | 0.26 |
| BYK 300[5] | 0.43 | 0.28 |
| DDBSA[6] | 0.71 | 0.5 |

[1]Ethyl-3-ethoxy propionate solvent available from Eastman Chemicals.
[2]2-(2'-Hydroxy-3',5'-ditert-amylphenyl) benzotriazole UV light stabilizer available from Ciba Specialty Chemicals.
[3]Bis(1,2,2,6,6-pentamethyl-4-piperidinyl)sebacate hindered amine stabilizer available from Ciba Specialty Chemicals.
[4]polybutyl acrylate is a flow control agent having a Mw of about 6700 and a Mn of about 2600 made in xylene at 62.5% solids.
[5]Solution of polyether modified dimethyl polysiloxane copolymer available from Byk-Chemie USA.
[6]Dodecyl benzene sulfonic acid.

EXAMPLES 2–20

The pre-mixture of ingredients from Example 1 was used in each of Examples 2–20, and their compositions are in Table 1 below. The amounts listed are resin solids:

TABLE 1

| Example # | Pre-mixture of Example 1 | Triazine[1] | SETAMINE US 138[2] | Acrylic of Example A |
|---|---|---|---|---|
| 2 | 3.5 | 5.0 | 20.0 | 75.0 |
| 3 | 3.5 | 5.0 | 25.0 | 70.0 |
| 4 | 3.5 | 5.0 | 30.0 | 65.0 |
| 5 | 3.5 | 5.0 | 45.0 | 50.0 |
| 6 | 3.5 | 10.0 | 10.0 | 80.0 |
| 7 | 3.5 | 10.0 | 20.0 | 70.0 |
| 8 | 3.5 | 10.0 | 25.0 | 65.0 |
| 9 | 3.5 | 10.0 | 30.0 | 60.0 |
| 10 | 3.5 | 10.0 | 40.0 | 50.0 |
| 11 | 3.5 | 20.0 | 10.0 | 70.0 |
| 12 | 3.5 | 20.0 | 20.0 | 60.0 |
| 13 | 3.5 | 20.0 | 25.0 | 55.0 |
| 14 | 3.5 | 20.0 | 35.0 | 45.0 |
| 15 | 3.5 | 30.0 | 15.0 | 55.0 |
| 16 | 3.5 | 0 | 35.0 | 65.0 |
| 17 | 3.5 | 26.0 | 0 | 74.0 |
| 18 | 3.5 | 13.4 | 13.4 | 73.3 |
| 19 | 3.5 | 26.7 | 0 | 73.3 |
| 20 | 3.5 | 15.0 | 20.0 | 65.0 |

[1]Tris (alkyl carbamoyl) triazine available from CYTEC Industries, Inc. The triazine had a resin solids content of about 53 percent by weight and the alkyl substituent was mixed methyl and butyl.
[2]Butylated melamine-formaldehyde resin (70% resin solids) available from Akzo Nobel Resins.

The resultant formulated coating compositions were reduced to a viscosity to 25 seconds (measured using a #4 Ford cup) with a blend of AROMATIC 100 and EKTAPRO EEP.

EXAMPLES 21–24

Examples 21–24 illustrate the preparation of clear film-forming compositions using the polymeric acrylic polyol of Example B. Examples 21 and 24 are illustrative of the present invention. Examples 22 and 23 are comparative in that the composition of Example 22 contains no triazine and the composition of Example 23 contains no aminoplast. The compositions were formulated from the following ingredients. The amounts listed are the total parts by weight and the amount within parenthesis are percentages by weight based on weight of resin solids:

| Ingredient | Example 21 | Example 22 | Example 23 | Example 24 |
|---|---|---|---|---|
| AROMATIC 100 | 15.0 | 15.0 | 15.0 | 15.0 |
| Ethanol | 5.0 | 5.0 | 5.0 | 5.0 |
| EKTAPRO EEP | 10.0 | 10.0 | 10.0 | 10.0 |
| TINUVIN 328 | 1.6 | 1.6 | 1.6 | 1.6 |
| TINUVIN 292 | 0.8 | 0.8 | 0.B | 0.8 |
| polybutyl acrylate | 0.52 | 0.52 | 0.52 | 0.52 |
| BYK 300 | 0.43 | 0.43 | 0.43 | 0.43 |
| DDBSA | 0.71 | 0.71 | 0.71 | 0.71 |
| Triazine | 18.9(10) | — | 49.1(26) | 18.9(10) |
| SETAMINE US 138 | 35.7(25) | 50.0(35) | — | 28.6(20) |
| Acrylic of Example B | 99.7(65) | 99.7(65) | 113.5(74) | 107.4(70) |

EXAMPLES 25–27

Examples 25–27 illustrate the preparation of clear film-forming compositions using blends of a polymeric acrylic polyol and a polyester polyol. The compositions were formulated from the following ingredients. The amounts listed are the total parts by weight and the amounts within parenthesis are percentages by weight based on weight of resin solids:

| Ingredient | Example 25 | Example 26 | Example 27 |
|---|---|---|---|
| AROMATIC 100 | 15.0 | 15.0 | 15.0 |
| Ethanol | 5.0 | 5.0 | 5.0 |
| EKTAPRO EEP | 10.0 | 10.0 | 10.0 |
| TINUVIN 328 | 1.6 | 1.6 | 1.6 |
| TINUVIN 292 | 0.8 | 0.8 | 0.8 |
| polybutyl acrylate | 0.52 | 0.52 | 0.52 |
| BYK 300 | 0.43 | 0.43 | 0.43 |
| DDBSA | 0.71 | 0.71 | 0.71 |
| Triazine | 18.9(10) | 18.9(10) | 18.9(10) |
| SETAMINE US 138 | 35.7(25) | 35.7(25) | 35.7(25) |
| Polyester polyol[1] | 10.0(10) | 20.0(20) | 30.0(30) |
| Acrylic of Example B | 85.8(55) | 70.2(45) | 54.6(35) |

[1]Prepared according to U.S. Pat. No. 5,663,244, Example E (100 percent resin solids)

The film-forming compositions of Examples 2–27 were spray applied to a pigmented base coat to form color-plus-clear composite coatings over electrocoated steel panels. The panels were coated with ED 5050A electrocoat and GPXJ-225 primer, both available from PPG Industries, Inc. The base coat is available from PPG Industries, Inc. as ONYX BLACK.

The base coat was spray applied in two coats to electrocoated, primed steel panels at a temperature of about 75° F. (24° C.). A ninety-second flash was allowed between the two base coat applications. After the second base coat application, a flash time of ninety seconds was allowed before application of the clear coating composition. The clear coating compositions of Examples 2–27 were each applied to a base coated panel in two coats with a ninety-second flash at 75° F. (24° C.) between the coats. The composite coating was allowed to air flash at 75° F. (24° C.) for ten minutes. Two panels of each clear coat were prepared. One panel was baked 30 minutes at 266° F. (130° C.) and one panel was baked 30 minutes at 285° F. (141° C.) to cure both the base coat and the clear coat. The panels were baked in a horizontal position. The properties of the composite coatings are reported in Table 2 below.

TABLE 2

| Example # | 266° F. bake mar gloss[1] | 285° F. bake mar gloss | 266° F. bake 20% acid[2] | 285° F. bake 20% acid | 266° F. bake 10% acid[3] | 285° F. bake 10% acid |
|---|---|---|---|---|---|---|
| 2* | 51 | 70 | 3 | 1 | 4 | 0 |
| 3 | 79 | 83 | 1 | 0 | 1 | 0 |
| 4 | 75 | 89 | 2 | 2 | 1 | 2 |
| 5* | 85 | 96 | 4 | 4 | 5 | 4 |
| 6* | 41 | 47 | 0 | 0 | 0 | 0 |
| 7 | 74 | 83 | 1 | 2 | 0 | 2 |
| 8 | 79 | 87 | 2 | 2 | 1 | 2 |
| 9 | 83 | 90 | 5 | 3 | 2 | 1 |
| 10* | 84 | 92 | 5 | 5 | 5 | 5 |
| 11* | 72 | 80 | 3 | 4 | 4 | 4 |
| 12 | 78 | 85 | 3 | 3 | 3 | 3 |
| 13* | 69 | 88 | 5 | 5 | 4 | 4 |
| 14* | 74 | 90 | 5 | 5 | 5 | 5 |
| 15* | 66 | 78 | 5 | 5 | 5 | 4 |
| 16* | 80 | 89 | 4 | 4 | 4 | 4 |
| 17* | 65 | 69 | 8 | 0 | 0 | 0 |
| 18* | 62 | 80 | 1 | 0 | 0 | 0 |
| 19* | 64 | 64 | 1 | 0 | 0 | 0 |
| 20 | 78 | 87 | 2 | 2 | 2 | 2 |
| 21 | 76 | 87 | 3 | 3 | 4 | 8 |
| 22* | 73 | 79 | 5 | 4 | 5 | 4 |
| 23* | 64 | 73 | 0 | 0 | 0 | 0 |
| 24 | 75 | 82 | 3 | 1 | 3 | 1 |
| 25 | 74 | 85 | 1 | 2 | 2 | 1 |
| 26 | 69 | 78 | 2 | 2 | 2 | 2 |
| 27 | 65 | 77 | 2 | 2 | 1 | 2 |

*Asterisk indicates comparative example
[1]Ten double rubs with felt cloth using a Crockmeter (available from Atlas Electric Devices Company) with dry BON-AMI cleanser (Faultless Starch/Bon Ami C0.). 20° gloss read on marred area of panel after being washed and dried. Two mar areas per panel, average reading reported in above table.
[2]20% sulfuric acid in water made from 18M concentrated sulfuric acid. The acid solution was allowed to equilibrate and cool down over a 16 hour period. Two 50 µl drops per panel were placed about two inches apart. The drops were then covered with caps to prevent evaporation of the acid solution. Test was run for 24 hours. After 24 hours the panels were dipped in deionized water and dried with a paper towel. The panels were rated for damage against a set of standards with the following scale: "0" = no detectable change, "1" = slight visible damage, "2" = visible circle, easy to detect, "3" = slight cloudiness, "4" = cloudiness and first structural change, "5" = visible and irreversible damage. A rating of a "3" or better is was considered a "pass" in the test.
[3]10% sulfuric acid test the same as above except 10% sulfuric acid was made.

The data in Table 2 illustrate that the levels of each of triazine and aminoplast in a film-forming composition, as well as the total of both, contribute to the mar and acid etch resistance of the cured coating. Of the comparative examples exhibiting poor mar resistance, (Examples 2, 6, 17–19, and 23) most of these (Examples 6, 17–19, and 23) had levels of aminoplast lower than that of the present invention. Example 2 had total crosslinker levels outside the range of the invention. Of the comparative examples exhibiting poor acid etch resistance, (Examples 5, 10, 13–16, and 22), Examples 5 and 10 had levels of aminoplast higher than that of the present invention. Surprisingly Example 11 had aminoplast levels lower than that of the present invention and Examples 16 and 22 had a triazine level lower than that of the present invention. Examples 5, 10 and 13–15 had total crosslinker levels outside the range of the invention.

We claim:
1. A curable film-forming composition comprising:
   (a) an acrylic polyol polymer;
   (b) about 20 to about 35 percent by weight, based on total weight of resin solids, of an aminoplast; and
   (c) about 1 to 20 percent by weight, based on total weight of resin solids, of a triazine compound of the formula: $C_3N_3(NHCOXR)_3$, wherein X is nitrogen, oxygen, sulfur, phosphorus, or carbon, and R is a lower alkyl group having one to twelve carbon atoms, or mixtures of lower alkyl groups;
wherein the total of components (b) and (c) is greater than 25 and less than 45 percent by weight, based on the total weight of resin solids.
2. The curable composition of claim 1 wherein the acrylic polyol polymer is present in the film-forming composition in amounts of about 55 to about 70 percent by weight based on total weight of resin solids in the film-forming composition.
3. The curable composition of claim 1 wherein the total of component (b) and (c) is about 30 to 40 percent by weight based on total weight of resin solids in the film-forming composition.
4. The curable composition of claim 1 wherein the acrylic polymer is prepared from the following ingredients:
   1) up to about 70 percent by weight of an ethylenically unsaturated, beta-hydroxy ester functional monomer selected from the group consisting of:

a) an ethylenically unsaturated, epoxy functional monomer and a saturated carboxylic acid having about 13 to about 20 carbon atoms; and b) an ethylenically unsaturated acid functional monomer and an epoxy compound containing at least 5 carbon atoms which is not polymerizable with the ethylenically unsaturated acid functional monomer;

2) about 5 to about 50 percent by weight, based on the total solid weight of monomers used to prepare the polymer, of an ethylenically unsaturated, hydroxyalkyl functional monomer;

3) about 0 to about 40 percent by weight, based on the total solid weight of monomers used to prepare the polymer, of a vinyl aromatic monomer;

4) about 0 to about 60 percent by weight, based on the total solid weight of monomers used to prepare the polymer, of at least one alkyl ester of acrylic acid or methacrylic acid; and 5) about 0 to about 20 percent by weight, based on the total solid weight of monomers used to prepare the polymer, of at least one ethylenically unsaturated monomer different from 1), 2), 3), and 4) above.

5. The curable composition of claim 4 in which (4) comprises up to 30 percent by weight based on total solid weight of monomers, of an alkyl ester of acrylic or methacrylic acid having 4 to 18 carbon atoms.

6. The curable composition of claim 4 wherein the ethylenically unsaturated, beta-hydroxy ester functional monomer is derived from an ethylenically unsaturated, epoxy functional monomer and a saturated carboxylic acid having about 13 to about 20 carbon atoms.

7. The curable composition of claim 6 wherein the ethylenically unsaturated, beta-hydroxy ester functional monomer is derived from glycidyl methacrylate and isostearic acid.

8. The curable composition of claim 4 wherein the ethylenically unsaturated, beta-hydroxy ester functional monomer is derived from an ethylenically unsaturated acid functional monomer and an epoxy compound containing at least 5 carbon atoms which is not polymerizable with the ethylenically unsaturated acid functional monomer.

9. The curable composition of claim 8 wherein the ethylenically unsaturated, beta-hydroxy ester functional monomer is present in the polymer in an amount of about 20 to about 55 percent by weight, based on the total solid weight of monomers used to prepare the polymer.

10. The curable composition of claim 8, wherein the ethylenically unsaturated, acid functional monomer is selected from the group consisting of acrylic acid, methacrylic acid, methacrylic anhydride, itaconic acid, and mixtures thereof.

11. The curable composition of claim 8, wherein the epoxy compound has the following structure:

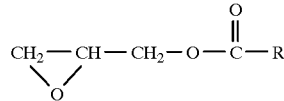

wherein R is a hydrocarbon radical containing from about 4 to about 26 carbon atoms.

12. The curable composition of claim 11, wherein R is a tertiary aliphatic group of about 8 to about 10 carbon atoms.

13. The curable composition of claim 4, wherein the ethylenically unsaturated, hydroxyalkyl functional monomer is selected from the group consisting of hydroxyethyl acrylate, hydroxyethyl methacrylate, hydroxypropyl acrylate, hydroxypropyl methacrylate, 4-hydroxybutyl acrylate, 4-hydroxybutyl methacrylate, adducts of caprolactone and hydroxyalkyl acrylates and methacrylates and mixtures thereof.

14. The curable composition of claim 13, wherein the ethylenically unsaturated, hydroxyalkyl functional monomer is hydroxyethyl methacrylate, present in an amount of about 10 to about 30 percent by weight, based on the total solid weight of monomers used to prepare the polymer.

15. The curable composition of claim 5, wherein component 4) is selected from the group consisting of n-butyl acrylate, t-butyl acrylate, 2-ethylhexyl acrylate, isobornyl acrylate, cyclohexyl acrylate, t-butyl cyclohexyl acrylate, trimethyl cyclohexyl acrylate, lauryl acrylate, n-butyl methacrylate, t-butyl methacrylate, 2-ethylhexyl methacrylate, isobornyl methacrylate, cyclohexyl methacrylate, t-butyl cyclohexyl methacrylate, trimethyl cyclohexyl methacrylate, lauryl methacrylate, and mixtures thereof.

16. The curable composition of claim 4, wherein the acrylic polymer contains carbamate functionality.

17. The curable composition of claim 4, wherein the vinyl aromatic monomer is present in the acrylic polymer in an amount of about 15 to about 35 percent by weight, based on the total solid weight of monomers used to prepare the polymer.

18. The curable composition of claim 1, further comprising an additional polyol polymer or oligomer different from the acrylic polyol polymer of component (a), selected from acrylic polymers, polyester polymers and oligomers, polyurethane polymers and oligomers, and mixtures thereof.

19. The curable composition of claim 18, wherein the additional polyol polymer or oligomer is present in an amount of up to 30 percent by weight based on the total weight of resin solids in the film-forming composition.

20. The curable composition of claim 19, wherein the additional polyol polymer or oligomer is a polyester polymer.

21. A multi-component composite coating composition comprising a base coat deposited from a pigmented film-forming composition and a transparent top coat applied over the base coat in which the transparent top coat is deposited from a clear film-forming composition comprising:

(a) an acrylic polyol polymer;

(b) about 20 to about 35 percent by weight, based on the total weight of resin solids, of an aminoplast; and (c) about 1 to 20 percent by weight, based on the total weight of resin solids, of a triazine compound of the formula: $C_3N_3(NHCOXR)_3$, wherein X is nitrogen, oxygen, sulfur, phosphorus, or carbon, and R is a lower alkyl group having one to twelve carbon atoms, or mixtures of lower alkyl groups;

wherein the total of components (b) and (c) is greater than 25 and less than 45 percent by weight, based on the total weight of resin solids.

22. The multi-component composite coating composition of claim 21, wherein the acrylic polyol polymer is present in the clear film-forming composition in amounts of about 55 to 70 percent by weight based on the total weight of resin solids in the clear film-forming composition.

23. The multi-component composite coating composition of claim 21 wherein the total of component (b) and (c) is about 30 to 40 percent by weight based on the total weight of resin solids in the clear film-forming composition.

24. The multi-component composite coating composition of claim 21 wherein the acrylic polymer is prepared from the following ingredients:
1) up to abut 70 percent by weight of an ethylenically unsaturated, beta-hydroxy ester functional monomer selected from the group consisting of:
   a) an ethylenically unsaturated, epoxy functional monomer and a saturated carboxylic acid having about 13 to about 20 carbon atoms; and
   b) an ethylenically unsaturated acid functional monomer and an epoxy compound containing at least 5 carbon atoms which is not polymerizable with the ethylenically unsaturated acid functional monomer;
2) about 5 to about 50 percent by weight, based on the total solid weight of monomers used to prepare the polymer, of an ethylenically unsaturated, hydroxyalkyl functional monomer;
3) about 0 to about 40 percent by weight, based on the total solid weight of monomers used to prepare the polymer, of a vinyl aromatic monomer;
4) about 0 to about 60 percent by weight, based on the total solid weight of monomers used to prepare the polymer, of at least one alkyl ester of acrylic acid or methacrylic acid; and
5) about 0 to about 20 percent by weight, based on the total solid weight of monomers used to prepare the polymer, of at least one ethylenically unsaturated monomer different from 1), 2), 3), and 4) above.

25. The multi-component coating composition of claim 24 in which (4) comprises up to 30 percent by weight based on total solids weight of monomer, of an alkyl ester of acrylic or methacrylic acid having 4 to 18 carbon atoms.

* * * * *